United States Patent

Wieczorek, Jr. et al.

[11] Patent Number: 5,519,072
[45] Date of Patent: May 21, 1996

[54] AQUEOUS ADHESIVE COMPOSITIONS FOR USE IN BINDING BOOKS

[75] Inventors: Joseph Wieczorek, Jr., Flemington; Lynne M. Mahoney, Piscataway, both of N.J.

[73] Assignee: National Starch and Chemical Investment Holding Corporation, Wilmington, Del.

[21] Appl. No.: 388,869

[22] Filed: Feb. 15, 1995

[51] Int. Cl.$^6$ .................................................. C08L 3/02
[52] U.S. Cl. .................................................. 524/48
[58] Field of Search .................................. 524/47, 48, 53, 524/405

[56] References Cited

U.S. PATENT DOCUMENTS

| | | | |
|---|---|---|---|
| 4,055,694 | 10/1977 | Hadgraft et al. | 524/53 |
| 4,575,525 | 3/1986 | Wacome et al. | 524/48 |
| 4,678,824 | 7/1987 | Lauria | 524/48 |

OTHER PUBLICATIONS

"Bookbinding With Adhesives", Tony Clark, Second Edition, pp. 1–3, 89.

*Primary Examiner*—Peter A. Szekely
*Attorney, Agent, or Firm*—William K. Wissing

[57] ABSTRACT

Adhesive compositions which are free of humectants are prepared from vinyl acetate homopolymer and/or ethylene vinyl acetate copolymer latices which have been prepared by emulsion polymerization methods which utilize dextrin as the protective colloid. The adhesives are characterized by superior adhesion in case making and are prepared by post-adding specific amounts dextrin and a borax to the dextrin-emulsified polymer latex.

5 Claims, No Drawings

AQUEOUS ADHESIVE COMPOSITIONS FOR USE IN BINDING BOOKS

FIELD OF THE INVENTION

Adhesive compositions which are free of humectants are prepared from vinyl acetate homopolymer and/or ethylene vinyl acetate copolymer latices which have been prepared by emulsion polymerization methods which utilize dextrin as the protective colloid. The adhesives are characterized by superior adhesion in bookbinding applications such as case making and are prepared by post-adding a dextrin and a borax to the dextrin-emulsified polymer latex.

BACKGROUND OF THE INVENTION

Various classes of adhesives are used in binding techniques utilized in the bookbinding industry. For example, synthetic emulsion adhesives, such as polyvinyl alcohol or ethylene vinyl acetate emulsion polymers, are used on endpapers, for tipping, for gluing-off operations, for lining, casing-in, spine gluing and side gluing, and on special stencil applicator case makers. Hot melt adhesives consist of polymers, tackifier resins and waxes. Hot melts are used mainly as one-shot adhesives for pocket-books and magazines, in multi-shot applications in the production of catalogues, and in burst binding. Starches derived from maize, potato and tapioca are used for producing pastes, generally for the hand-binding section of the trade. However, some are used in operations such as endpapering and tipping, also hand case making in leather. Starches can be modified into dextrins, which increases their solid content and their tack and speed.

Case making is one of the more demanding bookbinding techniques with respect to the adhesive properties required of the bookbinding adhesive utilized therein. Animal glues are mainly used for case making and lining, and only occasionally in unsewn binding lines. Animal glues consist of one or more kinds of gelatine in a solution of water. They give aggressive tack with a medium-set speed. Such glues are available in slab jelly form, or as harder granules. Since animal glues are derived from natural materials, they are much subject to seasonal factors and tend to vary with their source of supply. Operators using them have to be skilled in achieving the right degree of dilution and tack. Most animal glues age and become brittle under dry, warm conditions, as is normally evident from the condition of the spine of a book kept for some time in a centrally heated home. In addition, as a natural product, animal glues are susceptible to enzymatic and bacterial attack.

It would be desirable to provide a synthetic adhesive composition which exhibits the set speed, tack and adhesion of animal glues in case making applications, yet has the advantages over animal glues of improved product consistency, less odor, increased compostability and resistance to enzymatic and bacterial attack.

SUMMARY OF THE INVENTION

We have found that if adhesive compositions are prepared by post-adding specific amounts of dextrin to ethylene vinyl acetate copolymer latices, or to vinyl acetate homopolymer latices, or to mixtures thereof, which latices have been prepared by emulsion polymerization wherein dextrin is used as an emulsifier, or protective colloid, the resulting adhesives provide a suitable replacement for animal glue in bookbinding applications, provided that the adhesive compositions are free of humectants. In accordance with the broadest embodiment of the invention, there is disclosed an adhesive composition which is free of humectants and which comprises 80% to 20% by weight of a polymer latex selected from the group consisting of ethylene vinyl acetate copolymer latices, vinyl acetate homopolymer latices, or mixtures thereof, which polymer latex has been prepared by emulsion polymerization wherein dextrin is used as an emulsifier, or protective colloid, greater than 10% and less than 50% by weight of a post-added dextrin and an amount of a borax effective to provide controlled crosslinking of the dextrin. In preferred embodiments, the adhesive compositions further comprise a plasticizer and a clay filler to modify or enhance certain characteristics of the adhesive compositions.

DETAILED DESCRIPTION OF THE INVENTION

In formulating the adhesives of the invention, it is necessary to achieve a Tg of film forming temperature within a critical range. It is generally accepted that polyvinyl acetate has a Tg of 30° C. By addition of increasing amounts of ethylene, it is possible to lower the Tg value. For use in the invention, we have found that sufficient ethylene should be added so as to reduce the Tg to within a range of +15° C. to –10° C. At Tg values above about 15° C., the adhesion properties are not adequate, while when the Tg is reduced below about –10° C., blocking becomes a problem. Blocking is an undesirable phenomenon which results when the coated substrates are stored and exposed to varying degrees of humidity resulting in the tendency of the adjacent surfaces of the stacked substrates to adhere to one another. The choice of the particular Tg to be used in the adhesive formulation will depend, in part, on the desired end use.

As to the dextrin utilized herein, the dextrin may be derived from any of the available starch bases, including, but not limited to, amioca, waxy maize, waxy sorghum, sago, tapioca, potato, corn, sorghum, rice and wheat as well as the derivatives thereof. In all instances, however, the applicable starch base should be in ungelatinized form and should remain in that form throughout the subsequent dextrinization process. A particularly preferred amioca starch is available from National Starch and Chemical Company under the trade name National 6750.

In converting these starch bases into dextrins, one may employ any of the usual dextrinization procedures well known to those skilled in the art, including treatment of starch with either heat or acid or by any other means desired by the practitioner. It should be noted that when reference is made to "dextrins" in the process of this invention, we also contemplate as included therein the degraded starch products prepared either by means of a process wherein the applicable starches are converted with acids and/or oxidizing agents, in the presence of water, at super atmospheric pressures and temperatures in excess of about 100° C., or by means of an enzyme conversion procedure utilizing such enzymes as alpha-amylase. Additional information relating to the dextrinization of starches, may also be obtained by reference to chapters XII–XIII of "Chemistry and Industry of Starch" edited by R. W. Kerr, published in 1950 by the Academic Press of New York, N.Y.

While the choice of the particular dextrin to be used is left to the practitioner, it is preferred that the same dextrin base used as the protective colloid in the polymerization process be used as the post-added dextrin component in formulating the adhesives of the preferred embodiment.

The adhesive polymer latex is prepared by conventional vinyl acetate or ethylene vinyl acetate emulsion polymerization procedures, with the one difference being the use of an aqueous solution of dextrin as the emulsifier or protective colloid. The polymerization is then carried out in an aqueous medium under pressures less than about 130 atmospheres in the presence of a catalyst with the system being maintained by a suitable buffering agent, if necessary, at a pH of 2 to 6. The polymerization is performed at conventional temperatures from about 20° C. to 110° C., preferably from 50° C. to 80° C. for sufficient time to achieve a low monomer content, e.g., from about 1 to 8 hours, preferably from 3 to 7 hours, to produce a latex having less than 1.5, preferably less than 0.5 weight percent free monomer. Conventional batch, semi-continuous or continuous polymerization procedures may be employed and are taught, for example, in U.S. Pat. Nos. 3,708,388 and 4, 164,488.

More specifically, a solution of the dextrin in water, typically at a concentration of 30 to 50% solids, is prepared in a polymerization vessel and a portion of the vinyl acetate monomer charged therein. After purging the reactor with nitrogen, the polymerization is then initiated by water soluble free radical initiator such as water soluble peracid or salt thereof, e.g., hydrogen peroxide, sodium peroxide, lithium peroxide, peracetic acid, persulfuric acid or the ammonium and alkali metal salts thereof, e.g., ammonium persulfate, sodium peracetate, lithium persulfate, potassium persulfate, sodium persulfate, etc. A suitable concentration of the initiator is from 0.05 to 5.0 weight percent and preferably from 0.1 to 3 percent based on the weight of the monomer.

The free radical initiator can be used alone and thermally decomposed to release the free radical initiating species or can be used in combination with a suitable reducing agent in a redox couple. The reducing agent is typically an oxidizable sulfur compound such as an alkali metal metabisulfite and pyrosulfite, e.g., sodium metabisulfite, potassium metabisulfite, sodium pyrosulfite, etc. The reducing agent is generally added towards the end of the polymerized and is used in an amount of from about 0.1 to 3 weight percent of the amount of polymer.

The ethylene content of the copolymer is determined by controlling the ethylene content of the aqueous polymerization medium. This may be accomplished by regulating the partial pressure of ethylene in the vapor phase over the medium, the temperature of polymerization and the degree of mixing between the vapor phase and the liquid medium. Generally, the polymerization, is performed at temperatures from 50° to 80° F. and, at these temperatures, ethylene partial pressures from 50 to 1,000, preferably from 250 to 750 psig. are sufficient to incorporate from 1 to 30, preferably from 5 to 25, weight percent ethylene in the polymer. The reaction medium is preferably agitated with a stirrer, however, other agitation can be used as sparging the liquid with recirculated ethylene from the vapor phase. In the preferred procedure, the ethylene partial pressures is maintained constant throughout the polymerization period so that this monomer is continuously supplied at a constant rate.

In addition to the required dextrin solution used as a protective colloid, other emulsifiers, generally of the non-ionic and anionic oil-in-water variety may also be used in the polymerization reaction. When used, it is generally present in amounts of 0.1 to 1 percent of the monomers used in the polymerization and is added either entirely to the initial charge or continuously or intermittently during polymerization or as a post-reaction stabilizer.

The preferred polymerization procedure is a modified batch processing wherein the major amounts of some or all the comonomers and emulsifier are charged to the reaction vessel after polymerization has been initiated. It is preferred to add the vinyl ester intermittently or continuously over the polymerization period which can be from 0.5 to about 10 hours, preferably from about 2 to about 6 hours.

The latices are produced and used at relatively high solids contents, e.g., between 35 and 5% although they may be diluted with water if desired. The preferred contents of total solids are from 40 to 70, and, most preferred, from 50 to about 68 weight percent. When used herein the term "solids" refers to the combined amounts of ethylene vinyl acetate resin, dextrin and other non-volatiles present in the latex.

The particle size of the latex can be regulated by the quantity and type of the emulsifying agent or agents employed. To obtain smaller particles sizes, greater amounts of emulsifying agents are used. As a general rule, the greater the amount of the emulsifying agent employed, the smaller the average particle size.

In preparing the adhesive composition, an aqueous solution of dextrin may be prepared and added to the dextrin-emulsified polymer latex or the dry dextrin may be added directly to the dextrin-emulsified polymer latex. If a plasticizer is to be used, it may be added to the latex polymer prior to addition of the post-added dextrin. The adhesive composition is then heated and maintained at a temperature of about 70° C. to 82° C. with agitation for a period of time sufficient to ensure complete dissolution of the dextrin. The borax and any optional ingredients which are to be employed in the adhesive would be added at this point and the resulting mixture then diluted with additional water, if necessary, to the desired viscosity, generally in the range of about 2,000 to 11,000 cps, preferably about 2,000 to 4,000 cps.

The adhesive composition comprises from 20% to 80% by weight of the dextrin-emulsified polymer latex, preferably from 35% to 65% by weight of the polymer latex, more preferably from 50% to 55% by weight of the polymer latex. The percentages of the adhesive components are based on the total weight of the adhesive composition unless indicated otherwise. A preferred polymer latex is a dextrin-emulsified ethylene vinyl acetate copolymer emulsion.

The post-added dextrin will be present in an amount greater than 10% by weight and less than 50% by weight of the adhesive composition, preferably from 15% to 45% by weight of the composition, more preferably from 20% to 40% by weight of the composition. The dextrin-emulsified polymer latex and the borax typically comprise the remainder of the composition. However, various optional additives, such as plasticizers, preservatives, thickeners, bleaching agents, fillers such as clays and pigments, defoamers, etc., may also be present in the adhesive compositions in order to modify or enhance certain characteristics thereof.

To be used in bookbinding applications contemplated by the invention, the adhesive compositions must be free of humectants. Such humectants are conventionally used in formulating remoistenable adhesives and typically include sugars, sorbitol, glycerine and related derivatives, propylene glycol and similar related glycols and the glycol ethers. The presence of humectants causes the adhered substrates to lift or curl. This effect would preclude adhesives containing humectant from use in the bookbinding applications contemplated by the present invention, such as case making.

As used herein, the term "borax" refers to sodium borax and includes, for example sodium borate decahydrate, sodium tetraborate decahydrate and sodium metaborate. The borax acts by complexing with the starch to produce negative charges and, in addition, tends to crosslink the starch or dextrin. This crosslinking mechanism increases the solution viscosity, the cohesiveness and wet tack of the adhesive. The borax is admixed with the dextrin-emulsified polymer latex and the post-added dextrin in amounts effective to provide crosslinking of the post-added dextrin. Crosslinking of the dextrin improves tack, hold out and bond strength. Preferably, the adhesive comprises at least 0.1% by weight of the borax. The upper limit of borax used is generally 10 percent by weight of the total amount of starch or dextrin.

Any plasticizer conventionally used in vinyl acetate-based waterborne packaging adhesives may be used herein. Plasticizers utilized in the adhesive compositions include, for example, acetyl tributyl citrate, butyl benzyl phthalate, butyl phthalyl butyl glycolate, dibutyl phthalate, dibutyl sebacate, diethyl phthalate, diethylene glycol dibenzoate, dipropylene glycol, dipropylene glycol dibenzoate, ethyl phthalyl ethyl glycolate, ethyl-p-toluene sulfonamide, hexylene glycol, ethyl phthalyl ethyl glycolate, polyoxyethylene aryl ether, tributoxyethyl phthalate, triethylene glycol polyester of benzoic acid and phthalic acid, or mixtures thereof. Of the plasticizers, dibenzoate types, phthalates, liquid polyesters or sulfonated types are preferred. When used, the plasticizer is used in amounts up to about 10% by weight of the adhesive composition. Preferably, the adhesive compositions will comprise by weight from 3% to 10%, more preferably from 5% to 8% of the plasticizer. A preferred plasticizer is available from Velsicol, Chicago, Ill., under the trade name Benzoflex 50.

Fillers are preferably used in the adhesive compositions according to the present invention. Types of fillers which may be utilized include, without limitation, bentonite, calcium carbonate, calcium silicate, clay, mica, nut shell flours, silica, talc, uncooked starches, and wood flour. The presence of the filler provides additional tack to the adhesive, increases hold out, and typically improves the bond strength of the adhesive due to the structure which is added to the adhesive. When used, the fillers are used in levels up to about 30% by weight of the adhesive composition, preferably from 5% to 20% by weight of the composition, more preferably from 7% to 18% by weight of the adhesive composition. A preferred clay filler is available from Engelhard, Edison, N.J., under the trade name ASP 900.

In the bookbinding industry, case making is one of the more demanding applications for a bookbinding adhesive. Conventional methods of case making are well known to those skilled in the art of bookbinding. An adhesive, conventionally an animal glue, is applied to the book cover stock. The cover stock is then affixed to the book block, or book board as it is sometimes referred to, according to conventional methods. In accordance with the present invention, methods of case making are disclosed which comprise applying to a cover stock an adhesive composition of the present invention, and affixing the cover stock to a book block.

Also contemplated by the present invention are books which have been manufactured utilizing an adhesive composition of the present invention.

In the examples that follow, an adhesive was prepared using an ethylene vinyl acetate latex which had been polymerized using dextrin as a protective colloid in accordance with the procedure set forth herein. The adhesives were prepared according to the basic procedure set forth herein above. The adhesives were evaluated according to the following test procedures.

1.5 mil Lamination Test Procedure:

The adhesive composition was heated to 65° C. A glass plate was placed under the clip of a clipboard. A sheet of board stock was placed between the clip and the glass plate. Strips of cover stock were cut to dimensions of 3.5 inches long, 1.5 inches wide in the machine direction. A strip of cover stock was placed between the clip and the board stock such that the clip was positioned about 0.25 inches from the top of the cover stock strip. The remainder of the cover stock was folded back to expose the board stock positioned under the cover stock. A 1.5 mil bird applicator with a one (1) inch gate, available from MCD Industries, Medfield, Mass., was placed between the cover stock and the board stock. A bead of the heated adhesive was applied under the bird applicator and drawn down the board stock. The cover stock was contacted with the board stock immediately and rolled once with a roller to adhere the cover stock to the board stock. The adhesion of the cover stock to the board stock was evaluated the nest day.

Adhesive Ratin:

Excellent=cover stock completely adhered to the cover board

Very Good=slight lift of the cover stock from board stock at either the top or bottom of the cover stock strip Fair=slight lift of cover stock from board stock at top and bottom of cover stock, or slight curling of the sides of the cover stock Poor=increased separation of the cover stock from the board stock at the top and bottom of the cover stock and lengthwise curling of the cover stock such that the angle of the curl can be measured

EXAMPLE 1

Polymer Latex Level

A series of adhesives was prepared with varying levels of an ethylene vinyl acetate copolymer latex, 5.8% of a plasticizer, 31.5% of a dextrin derived from amioca starch, 0.23% of a defoamer, 8.2% of a clay, 0.1% of sodium metaborate and the balance to 100% of water. All weights are based on the total weight of the adhesive formulation unless specified otherwise. Adhesive results are set forth in Table 1. The results indicate that for adhesives containing 20% and 80% of the polymer latex, adhesion is fair to good. Adhesives containing 50% to 55% of the latex polymer exhibit excellent adhesion.

TABLE 1

| FORMULATION | 1A | 1B | 1C | 1D | 1E | 1F |
|---|---|---|---|---|---|---|
| % Polymer Latex | 50 | 20 | 35 | 55 | 65 | 80 |
| % Solids | 76.7 | 75.4 | 75.6 | 75.9 | 75.2 | 75.3 |
| Viscosity (cps) | 3000 | 3000 | 3000 | 3000 | 3000 | 3000 |
| 1.5 mil Lamination | E | F-VG | F-VG | E | F-VG | F-G |

EXAMPLE 2

Post-added Dextrin Level

A series of adhesives was prepared as in Example 1, except that the latex polymer level was held constant at 50% and the post-added dextrin level was varied from 10% to 50%. Adhesive results are set forth in Table 2. The results indicate that at 10% and 50% of dextrin, respectively, adhesion of the adhesive was unacceptable for use in case making applications. Excellent adhesion was noted for adhesives containing from 20% to 40% of post-added dextrin.

TABLE 2

| FORMULATION | 2A | 2B | 2C | 2D | 2E |
| --- | --- | --- | --- | --- | --- |
| % Dextrin | 10 | 20 | 31.5 | 40 | 50 |
| % Solids | 74.6 | 76.7 | 75.3 | 75.2 | 73.2 |
| Viscosity (cps) | 3075 | 3000 | 2900 | 3000 | 2750 |
| 1.5 mil Lamination | P | E | E | E | P |

EXAMPLE 3

Humectant

A series of adhesives was prepared as in Example 1, except that the latex polymer level was held constant at 50% and various humectants were added to the adhesives at varying levels. Adhesive results are set forth in Table 3. The results indicate that the presence of humectant in the adhesive compositions of the present invention destroy the adhesive properties of the adhesive compositions.

TABLE 3

| FORMULATION | 3A | 3B | 3C | 3D |
| --- | --- | --- | --- | --- |
| % Humectant | 0 | 0.5 | 1.0 | 2.0 |
| Humectant | — | Glucose | Glycerine | Propylene Glycol |
| % Solids | 76.7 | 73.5 | 74.6 | 75.4 |
| Viscosity (cps) | 3000 | 2625 | 2625 | 3000 |
| 1.5 mil Lamination | E | P | P | NG |

EXAMPLE 4

Boration

An adhesive composition was prepared according to Formulation 1A and compared for adhesion to a similar adhesive composition which contained no sodium metaborate. Adhesion results are set forth in Table 4. The results indicate that some boration is required in order to provide adhesive compositions with adequate adhesion for bookbinding applications anticipated by the presented invention.

TABLE 4

| FORMULATION | 4A | 4B |
| --- | --- | --- |
| % Sodium Metaborate | 0.1 | 0 |
| % Solids | 76.7 | 74.6 |
| Viscosity (cps) | 3000 | 2800 |
| 1.6 mil Lamination | E | P |

EXAMPLE 5

Plasticizer

An adhesive composition was prepared according to Formulation 1A and compared for adhesion to a similar adhesive composition which contained no plasticizer. Adhesion results are set forth in Table 5. The results indicate that the use of a plasticizer is optional, but preferred.

TABLE 5

| FORMULATION | 5A | 5B |
| --- | --- | --- |
| % Plasticizer | 5.80 | 0 |
| % Solids | 75.3 | 73.7 |
| Viscosity (cps) | 2900 | 2700 |
| 1.5 mil Lamination | E | VG |

EXAMPLE 6

Dextrins

A series of adhesives were prepared based on Formulation 1A, comparing dextrins derived from amioca, tapioca, potato and corn starches, respectively. Adhesion results are set forth in Table 6. The results indicate that dextrins derived from amioca, tapioca and corn starches are preferred, with dextrins derived from potato starch being less preferred.

TABLE 6

| FORMULATION | 6A | 6B | 6C | 6D |
| --- | --- | --- | --- | --- |
| Starch | amioca | tapioca | corn | potato |
| % Solids | 76.7 | 77.4 | 75.2 | 77.2 |
| Viscosity (cps) | 3000 | 3000 | 3000 | 3100 |
| 1.5 mil Lamination | E | E | E | G |

We claim:

1. An adhesive composition comprising to 100% by weight:

(a) 20% to 80% by weight of a dextrin-emulsified polymer latex selected from the group consisting of ethylene vinyl acetate copolymer latices, vinyl acetate homopolymer latices, or mixtures thereof, which polymer latex has been prepared by emulsion polymerization, wherein dextrin is used as an emulsifier in the emulsion polymerization, (b) greater than 10% by weight and less than 50% by weight of a post-added dextrin which has been admixed with the dextrine-emulsified polymer latex subsequent to the polymerization thereof; and (c) a borax in an amount effective to provide crosslinking of the dextrin, wherein the adhesive composition is free of humectant.

2. The adhesive composition of claim 1 comprising at least 0.1% by weight of the borax, 35% to 65% by weight of the dextrin-emulsified polymer latex, and 15% to 45% by weight of the post-added dextrin.

3. The adhesive composition of claim 2 wherein the dextrin is derived from one or more starch bases selected from the group consisting of amioca, waxy maize, waxy sorghum, sago, tapioca, potato, corn, sorghum, rice and wheat.

4. The adhesive composition of claim 3 further comprising up to about 10% by weight of a plasticizer and up to about 30% by weight of a filler.

5. The adhesive composition of claim 4 comprising 50% to 55% of the dextrin-emulsified polymer latex, 20% to 40% by weight of the post-added dextrin, 3% to 8% by weight of the plasticizer and 5% to 20% by weight of the filler, wherein the dextrin is derived from amioca starch base.

* * * * *